(12) United States Patent
Augustyniak et al.

(10) Patent No.: US 11,371,911 B2
(45) Date of Patent: Jun. 28, 2022

(54) SYSTEM AND METHOD FOR SENSOR FAULT MANAGEMENT

(71) Applicant: PRATT & WHITNEY CANADA CORP., Longueuil (CA)

(72) Inventors: Betty Augustyniak, St-Colomban (CA); Michael Darby, Candiac (CA); Farzad Baghernezhad, Lasalle (CA); Michael Chun, Vaughn (CA); Dave Sellors, Ancaster (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 143 days.

(21) Appl. No.: 16/722,692

(22) Filed: Dec. 20, 2019

(65) Prior Publication Data
US 2021/0190638 A1  Jun. 24, 2021

(51) Int. Cl.
*G01M 15/14* (2006.01)
*B64F 5/60* (2017.01)
*F01D 21/00* (2006.01)
*G07C 5/08* (2006.01)

(52) U.S. Cl.
CPC ............ *G01M 15/14* (2013.01); *B64F 5/60* (2017.01); *F01D 21/003* (2013.01); *G07C 5/0816* (2013.01); *F05D 2220/32* (2013.01); *F05D 2260/80* (2013.01)

(58) Field of Classification Search
CPC ......... B64F 5/60; G01M 15/14; G07C 5/0816
See application file for complete search history.

(56) References Cited

U.S. PATENT DOCUMENTS

| | | | |
|---|---|---|---|
| 5,522,026 A | 5/1996 | Records et al. | |
| 8,886,582 B2 | 11/2014 | Le Gonidec et al. | |
| 10,247,032 B2 | 4/2019 | Gill et al. | |
| 10,339,730 B2 | 7/2019 | Rivera et al. | |
| 2014/0090456 A1 | 4/2014 | Meisner et al. | |
| 2019/0286506 A1 | 9/2019 | Cheng et al. | |
| 2021/0062673 A1* | 3/2021 | Drolet | F01D 17/085 |
| 2021/0192873 A1* | 6/2021 | Soukhostavets | B64D 45/00 |

FOREIGN PATENT DOCUMENTS

| | | |
|---|---|---|
| CN | 107340764 | 11/2017 |
| CN | 109318907 | 2/2019 |

OTHER PUBLICATIONS

Extended European Search Report dated Apr. 23, 2021 in counterpart EP application No. 20215821.8.

* cited by examiner

*Primary Examiner* — Eric S. McCall
(74) *Attorney, Agent, or Firm* — Norton Rose Fulbright Canada LLP

(57) ABSTRACT

Methods and systems for sensor fault management are provided. A plurality of potential faults associated with a sensor are obtained. Accommodation approaches are associated with the plurality of potential faults. Severity levels are associated to the plurality of potential faults to produce a hierarchy of potential faults. A fault management tool is generated based on the hierarchy, the fault management tool defining a framework implementable by a controller associated with the sensor for accommodating faulty behaviour of the sensor by following the accommodation approaches of the hierarchy for the plurality of potential faults.

18 Claims, 7 Drawing Sheets

414

| Parameter | Fault | | | | |
|---|---|---|---|---|---|
| | Interface | Range | Rate (Optional) | Validity (Optional) | Cross Channel (Optional) |
| Thresholds | N/A | Min and Max limits (in measurement units) | Maximum change per sec | N/A | Maximum tolerance |
| Latch Time | | Signal loss latch time in seconds | | | In range latch time in seconds |

412 { (Thresholds, Latch Time rows)

| Priority ↘ | | Accommodation Approaches | | | | | | | |
|---|---|---|---|---|---|---|---|---|---|
| Fault Type | FD State | Option #1 | Option #2 | Option #3 | Option #4 | Option #5 | Option #6 | Option #7 | Option #8 |
| Fault #1 | Latched | N/A | N/A | ✓ | N/A | N/A | | ✓ | ✓ |
| | Detected | N/A | N/A | ✓ | N/A | N/A | | ✓ | |
| Fault #2 | Latched | | | | | ✓ | ✓ | N/A | |
| | Detected | | | | | ✓ | | N/A | |
| No Fault | | ✓ | ✓ | N/A | N/A | N/A | N/A | N/A | N/A |

| Priority ↘ | | Accommodation Approaches | | | |
|---|---|---|---|---|---|
| Fault Type | FD State | Option #1 | Option #2 | Option #3 | Option #4 |
| Fault #1 | Latched | N/A | ✓ | ✓ | ✓ |
| | Detected | N/A | ✓ | | ✓ |
| Fault #2 | Latched | | | ✓ | ✓ |
| | Detected | | | | ✓ |
| No Fault | | ✓ | N/A | N/A | ✓ |

SYSTEM AND METHOD FOR SENSOR FAULT MANAGEMENT

TECHNICAL FIELD

The present disclosure relates generally to control systems, and more specifically to fault management in control systems.

BACKGROUND OF THE ART

Engines may be controlled using logic-based computerized control systems, sometimes referred to as electronic engine controllers. These systems may receive inputs from operators and/or from sensors, in the form of analog or digital signals, and process the signals to interpret requests from the operators. However, in some cases these inputs can require correction before they are provided for use by the control system.

Therefore, improvements are needed.

SUMMARY

In accordance with a broad aspect, there is provided a method for sensor fault management. A plurality of potential faults associated with a sensor are obtained. Accommodation approaches are associated with the plurality of potential faults. Severity levels are associated to the plurality of potential faults to produce a hierarchy of potential faults. A fault management tool is generated based on the hierarchy, the fault management tool defining a framework implementable by a controller associated with the sensor for accommodating faulty behaviour of the sensor by following the accommodation approaches of the hierarchy for the plurality of potential faults In accordance with another broad aspect, there is provided a system for sensor fault management. The system comprises a processing unit, and a non-transitory computer-readable memory communicatively coupled to the processing unit. The computer-readable memory comprises computer-readable program instructions which are executable by the processing unit for: obtaining a plurality of potential faults associated with a sensor; associating accommodation approaches with the plurality of potential faults; associating severity levels to the plurality of potential faults to produce a hierarchy of potential faults; and generating a fault management tool based on the hierarchy, the fault management tool defining a framework implementable by a controller associated with the sensor for accommodating faulty behaviour of the sensor by following the accommodation approaches of the hierarchy for the plurality of potential faults Features of the systems, devices, and methods described herein may be used in various combinations, in accordance with the embodiments described herein.

BRIEF DESCRIPTION OF THE DRAWINGS

Reference is now made to the accompanying figures in which:

FIGS. 4A-C are tables of example fault detection or fault accommodation hierarchies;

It will be noted that throughout the appended drawings, like features are identified by like reference numerals.

DETAILED DESCRIPTION

When a sensor or other input device provides faulty information to a controller of an engine, various undesirable outcomes can occur. In some cases, the engine can be commanded by the controller to operate under non-optimal conditions, which can result in inefficient operation or increased wear-and-tear on engine components. In some other cases, the engine can suffer damage, or catastrophic failure can occur. As a result, various measures to detect and/or accommodate for faulty inputs to a controller can be implemented.

Fault management approaches (also sometimes termed "fault detection and accommodation" or "signal selection") involve two operations, which can be performed by a fault management tool. First, signals incoming to a controller are intercepted to perform fault detection; that is to say, to determine whether any signals are likely to be faulty. Second, when a faulty signal is detected, fault accommodation is performed; that is to say, one or more countermeasures are implemented to replace or correct the faulty signal with a corrected signal, which is then provided to the controller. When valid (i.e., non-faulty) signals are received at the fault management tool, they can simply be passed on to the controller absent any correction.

Figure 1:
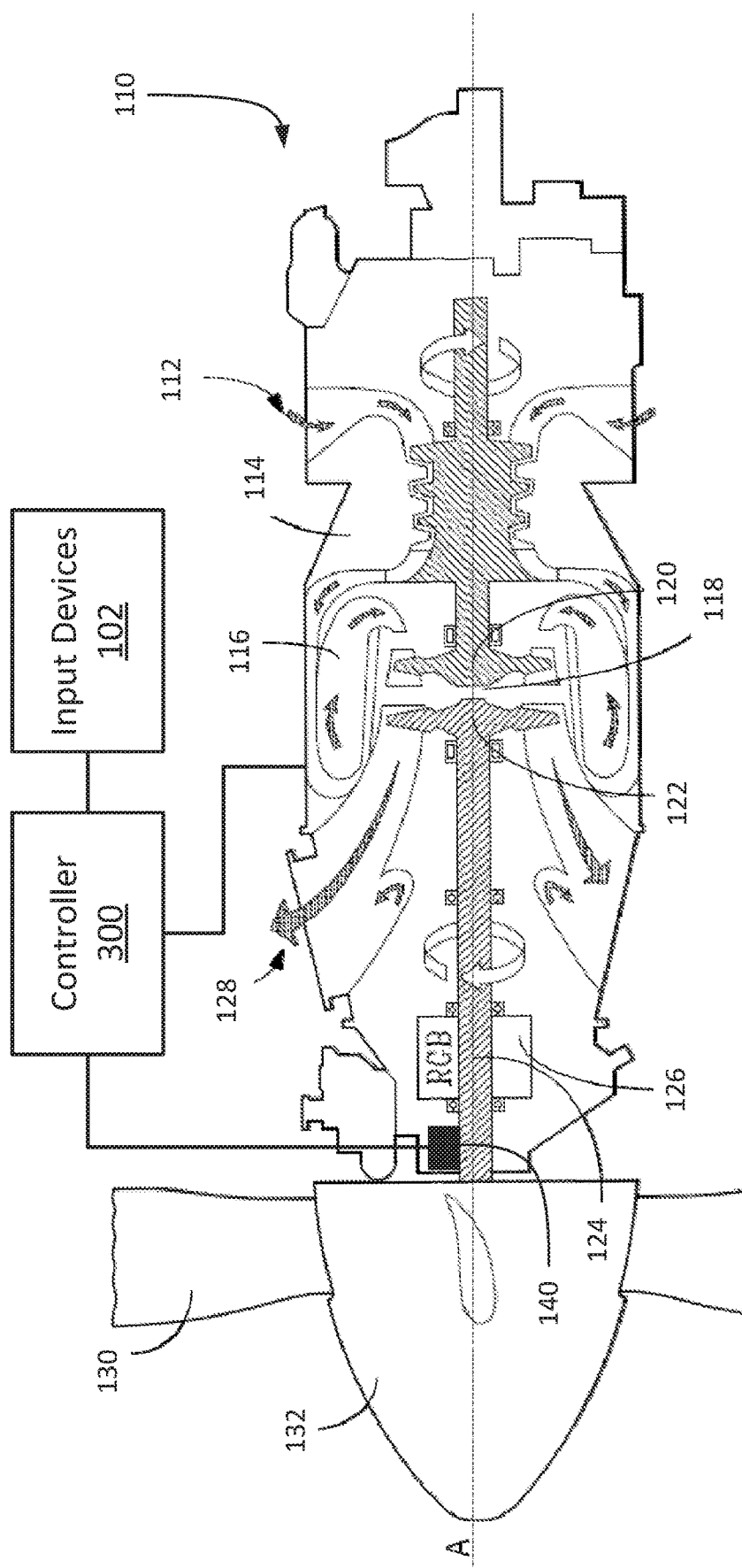
FIG. 1 is a schematic cross-sectional view of an example gas turbine engine.

For ease of understanding, the present disclosure describes fault detection and accommodation approaches within the context of an engine, as illustrated in FIG. 1. For the purposes of illustration, FIG. 1 depicts a gas turbine engine 110 of a type typically provided for use in subsonic flight. It should be noted, however, that the present disclosure could also be provided for other types of engines, as well as for any other type of device or system in which fault detection and/or accommodation could be used to mitigate the effects of faulty signals on control of the device or system.

With continued reference to FIG. 1, the engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases. The engine 110 can be controlled by way of a controller 300, which can be communicatively coupled to the engine 110 using any suitable communication paths, and can control any suitable aspects of the operation of the engine 110.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Rotation of the output shaft 124 is facilitated by one or more bearing assemblies, which can be disposed within the RGB 126 or at any other suitable location. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

The engine 110 can be provided with one or more sensors 140, which can be disposed at various locations throughout the engine 110, and can measure any suitable information about the engine 110. For example, the sensors 140 can include one or more temperature sensors, one or more pressure sensors, one or more angular rotation sensors, one or more torque sensors, or the like. The controller 300 is coupled to the sensors 140, which provide the controller 300 with various information about the operating conditions of the engine 110. In addition, the controller 300 can be coupled to a variety of input device 102 via which an operator of the engine 110 can provide commands to the controller 300. The input devices 102 can include levers, dials, switches, sticks, computing devices, keyboards, mice, touch interfaces, gamepads, or the like.

Figure 2:
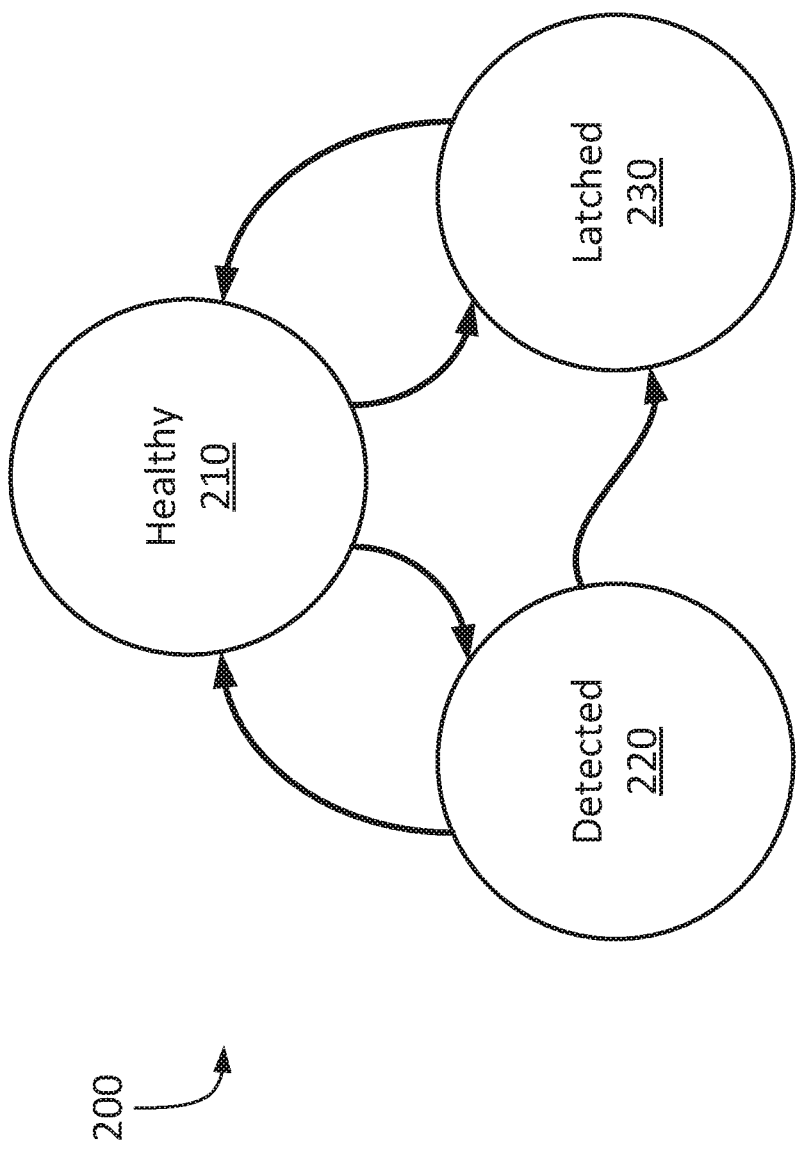
FIG. 2 is a state diagram for an example sensor.

With reference to FIG. 2, a state diagram 200 for a sensor, for instance one of the sensors 140, is illustrated. The sensor 140 can operate in one of three states: a healthy state 210, a "detected" state 220, and a "latched" state 230 (collectively termed "the states"). In the healthy state 210, the sensor 140 is functioning correctly and producing valid information. In the detected state 220, information from the sensor 140 are found to include possible faults, but failure of the sensor 140 is not yet confirmed. In the latched state 230, the sensor 140 is confirmed to have failed. In some cases, returning to the healthy state 210 from the latched state 230 requires a reset of the sensor 140, for instance powercycling or the like.

Transition between the states 210, 220, 230 can occur according to the pathways illustrated in the state diagram 200. Transition from the healthy state 210 to the detected state 220 occurs when the sensor 140 experiences a fault with a non-zero latch time. Transition from the detected state 220 to the healthy state 210 can occur if the sensor 140 is provided with self-resetting capabilities.

Transition from the detected state 220 to the latched state 230 occurs when the latch time for a particular fault is exceeded. For instance, a predetermined latch time can be set for a particular fault, and the fault is said to be latched once the latch time is exceeded. The sensor 140 cannot transition from the latched state 230 to the detected state 220, as the latched state 230 is a confirmation of a fault detected at the detected state 220.

In some embodiments, transition from the healthy state 210 to the latched state 230 occurs when a fault is specified with a zero-value latch time. A sensor 140 in the latched state 230 can transition back to the healthy state 210 if the sensor 140 is provided with self-healing capabilities, or following a reset of the sensor 140.

It should be noted that the description of the state diagram 200 is provided in general terms, and other approaches for transitioning between the states 210, 220, 230 are also considered.

Figure 3:
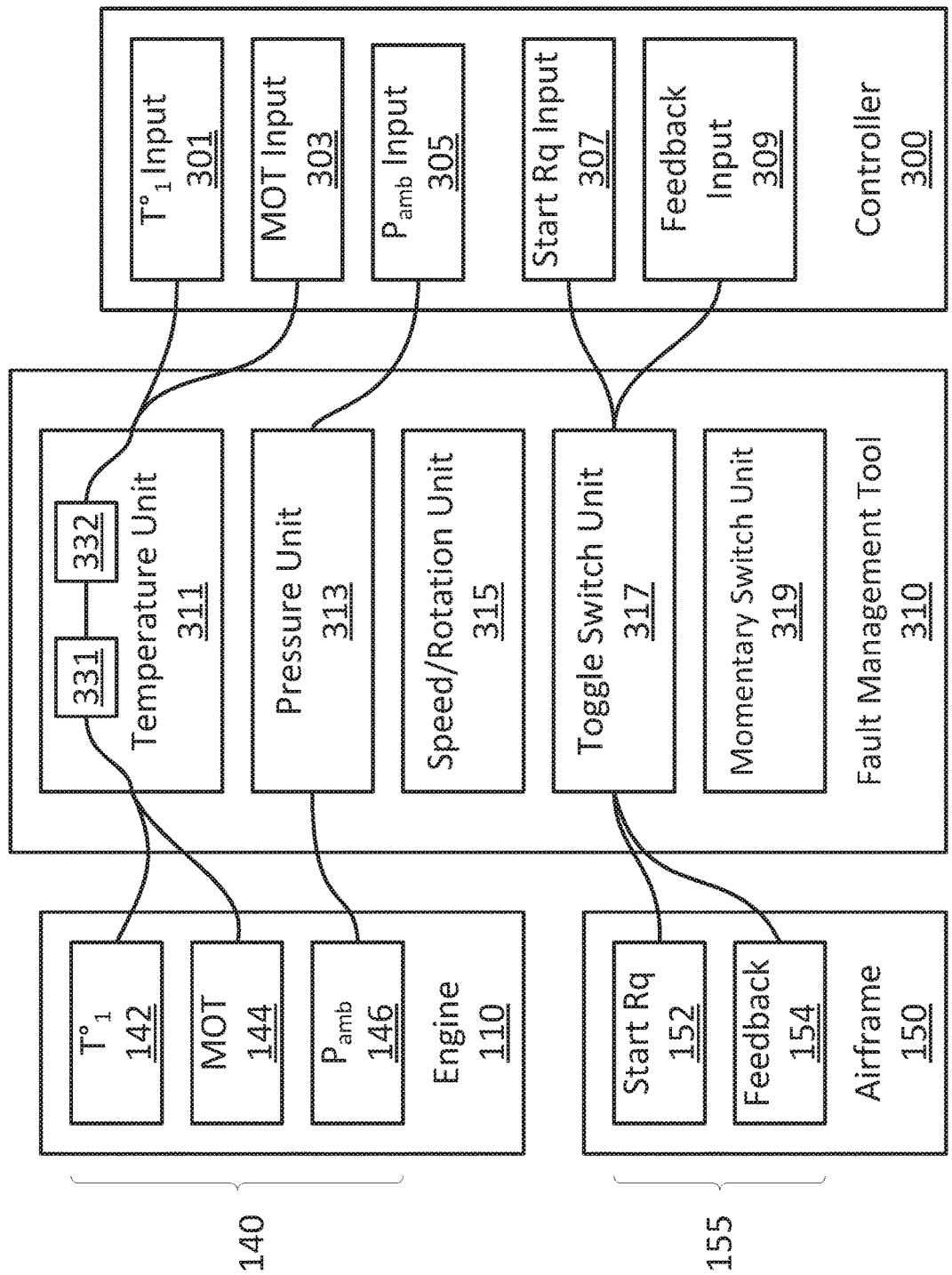
FIG. 3 is a schematic diagram of an example fault detection and accommodation architecture.

With reference to FIG. 3, in order to track the state of the sensor 140, and to properly mitigate faulty states for the sensors 140, a fault management tool 310 can be provided. For example, the fault management tool 310 monitors the information provided by the sensors 140 to detect when the sensors 140 enter a faulty state. The fault management tool 310 can also implement countermeasures to correct for faulty information provided by the sensors 140.

For the purposes of illustration, FIG. 3 illustrates the engine 110 including a number of sensors 140: a temperature sensor 142, measuring a temperature $T°_1$, a temperature sensor 144 measuring a main oil temperature (MOT), and a pressure sensor 146 measuring an ambient pressure $P_{amb}$. It should be recognized that the engine 110 can include any number of other sensors, including speed sensors, torque sensors, blade angle sensors, position sensors, and the like. Each of the sensors 140 is associated with a respective input at the controller 300: the temperature sensor 142 with the $T°_1$ input 301, the temperature sensor 144 with the MOT input 303, the pressure sensor 146 with the $P_{amb}$ input 305, and the like.

The fault management tool 310 can also be used to detect and accommodate faults from other types of signals, for example airframe signals 155 from an airframe 150 to which the engine 110 is coupled. The airframe signals 155 can include signals provided by an operator of the engine 110 and/or the airframe 150, for instance a pilot, via various input devices, for instance the input devices 102 described with reference to FIG. 1. In the embodiment illustrated in FIG. 3, the signals 155 include a start request The airframe signals 155 can also include additional sensors separate from those included within the engine 110. Other types of signals are also considered. Similarly, the signals 155 are associated with respective inputs at the controller 300: a start request signal 152 is associated with a start request input 307, and a feedback signal 154 is associated with a feedback input 309. It should be noted that the airframe signals 155 are still considered to be provided by sensors, as sensors are used to translate the commands provided via the input devices 102 into usable information.

The fault management tool 310 is coupled between the controller 300 and the inputs to the controller 300: in the embodiment illustrated in FIG. 3, the inputs to the controller 300 are the sensors 140 from the engine 110, and the airframe signals 155 from the airframe 150. The fault management tool 310 receives the information produced by the sensors 140 and the airframe signals 155 in order to perform fault detection and fault accommodation. The fault management tool 310 then passes on information to the controller 300, which can be the originally-received information from the sensors 140 and the airframe signals 155, or information which is the result of one or more accommodation approaches. It should be noted that in some embodiments, additional elements can be present between the between the controller 300 and the inputs thereto, including various signal processing and conversion tools, filters, and the like.

The fault management tool 310 is itself composed of a number of independent units (collectively termed "the units") associated with different types of information provided by the inputs 140, 155. In the embodiment illustrated in FIG. 3, the fault management tool 310 includes a temperature unit 311, associated with temperature sensors, for instance the temperature sensors 142, 144; a pressure unit 313, associated with pressure sensors; for instance the pressure sensor 146; and a speed/rotation unit 315, associated with speed and rotation sensors, which can include torque sensors, position sensors, and the like. The fault management tool 300 also includes a toggle switch unit 317, associated with toggle switches (i.e., switches having four states), and a momentary switch units 319, associated with momentary switches (i.e., switches having two states). The toggle switch unit 317 and the momentary switch unit 319 can be used, for instance, with digital inputs. In some embodiments, separate fault management tools 310 can be provided for analog and digital inputs. Digital inputs can include various serial and parallel input streams, including ARINC, CANbus, UART, Ethernet, and the like, and can be used with wired or wireless communication paths.

In some embodiments, the fault management tool 310 may have fewer units, with one or more of the units being integrated to provide functions that may in other embodiments be provided by more than one unit. In some embodiments, the fault management tool 310 may be provided as a single unit configured to perform the functions of that fault management tool 310, such as the functions of the present embodiment for example.

As illustrated in FIG. 3, the temperature unit 311 is provided with two modules: a fault detection module 331, and a fault accommodation module 332. For simplicity, the remaining units 313, 315, 317, and 319 are not shown in FIG. 3 as being provided with similar fault detection and fault accommodation modules, but it should be understood that they are similarly composed. In some embodiments, the units are composed of multiple pairs of fault detection and fault accommodation modules, for instance one pair for single-channel sensors, one pair for dual-channel sensors, one pair for quad-channel sensors, and the like.

In operation, information from the temperature sensors 142, 144, for example the temperature sensor 142, is intercepted by the fault management tool 310, and specifically by the fault detection module 331 of the temperature unit 311. The fault detection module 331 uses various algorithms and the like to determine whether the information provided by the temperature sensor 142 is faulty. When the information provided by the temperature sensor 142 is found not to be faulty, the fault detection module 331 can pass the information to the fault accommodation module 332 for transmission to the controller 300. Alternatively, the fault detection module 331 can pass the information directly to the controller 300.

When the information provided by the temperature sensor 142, is found to be faulty, the fault detection module 331 informs the fault accommodation module 332 that the temperature sensor 142 is faulty, and the fault accommodation module 332 implements one or more accommodation approaches to correct for the faulty temperature sensor 142. The temperature unit 311 then, by way of the fault accommodation module 332, provides corrected information to the controller 300.

In some embodiments, different units are provided as part of the fault management tool 310 for different kinds of sensors. The different units can serve to perform fault detection and/or accommodation in different ways for the different kinds of sensors. For instance, a first temperature unit 311 is provided for single-channel temperature sensors, and a second temperature unit 311 is provided for dual-channel temperature sensors. In some other instances, a first pressure unit 313 is provided for analog pressure sensors, and a second pressure unit 313 is provided for digital pressure sensors.

In some embodiments, the fault management tool 310 provides other information to the controller 300 beyond the corrected information. For example, the fault management tool 310 provides a "signal status" indication, which indicates to the controller 300 whether a particular signal is provided by a sensor which is in the healthy state, the detected state, or the latched state of FIG. 2. In another example, the fault management tool 310 provides an "accommodation source" indication, which indicates to the controller the origin of corrected information, when provided.

Fault detection and accommodation tools like the fault management tool 310 may, in some applications, require detailed instructions from specialized engineers to produce. In some cases, engineering teams prepare lengthy textual descriptions detailing different types of faults for various sensors, algorithms for fault detection, and different approaches for fault accommodation. Changes to fault management systems may require complete overhauls of an existing fault management system. In addition, a new textual description for fault management may need to be produced every time a new engine 110 or airframe 150 is designed, even if the same sensors are used for the same purpose. A more modular and portable approach for designing the fault management tool 310 could provide both reduced labour and design costs.

With reference to FIG. 4A-C, there is illustrated an architecture for fault management tools, such as the fault management tool 310. The architecture illustrated in FIGS. 4A-C provide a modular and reusable tool for implementing fault management, which can be designed once, implemented across a variety of systems, and readily modified when necessary.

In FIG. 4A, a table 410 for a fault detection tool is illustrated. The table 410 can be associated with a particular type of sensor or input type, for instance a single-channel temperature sensor. Other signals, for instance a dual-channel temperature sensor, or a pressure sensor, or a feedback signal, would be associated with a separate table 410.

Each of the rows 412 in the table 410 represents a different type of potential fault for the sensor or input type associated with the table 410. In the embodiment illustrated in FIG. 4A, the rows 412 include a first row for a "threshold" fault, and a second row for a "latch time" fault. Columns 414 of the table 410 represent different parameters for each of the potential faults. For example, a column specifies a range of acceptable values from a sensor, outside of which a "range fault" is detected. In another example, a column specifies a maximum rate of change per second for acceptable values from a sensor, outside of which a "rate fault" is detected. Other examples include an "interface fault" for faults flagged by the controller 300 and "validity faults" for when a value from one sensor or input type differs from values from other similar sensors or input types beyond a predetermined tolerance. Other faults are also considered, such as "cross-channel" or "cross-engine" faults when similar measurements are acquired on different channels, or across different engines, or "stuck input" faults if values from a momentary switch are maintained in a momentary state for longer than a predetermined time. The entries in the table 410 can be populated using information obtained from a database or other data store, using the output of an artificial intelligence or the like, or using input obtained from an operator or manufacturer of the engine 110, or of the sensor or input device associated with the table 410.

In FIG. 4B, a table 420 for a fault accommodation tool is illustrated. The table 420 can also be associated with a particular type of sensor or input type; for example, the table 420 can be used with analog signals. Each of the rows 422 in the table 420 represents a different type of potential fault for the sensor or input type associated with the table 420. In the embodiment illustrated in FIG. 4B, the rows 422 a first pair of rows associated with a "signal loss" fault and a second pair of rows associated with a "cross-channel" fault, with separate rows for latched and detected sensor states, as per FIG. 2 hereinabove. The rows 422 also include a "no-fault" row, which is associated with a healthy operating state of the sensor or input type. In some embodiments, the "no-fault" row is associated with a null severity level.

Columns 424 represent different fault accommodation approaches which can be used to accommodate for the potential faults listed in the rows 422. The entries in the table 420 are used to express whether a particular fault accommodation approach can be used for a particular potential fault. For instance, the first row of the rows 422, which is the row associated with "Fault #1", indicates "N/A" for the column entries associated with "Option #1", "Option #2", "Option #4", and "Option #5". This indicates that these accommodation approaches are not applicable. The "Option #3" and "Option #8" column entries indicated with a checkmark symbol, signifying that the accommodation approaches of those columns can be used as valid accommodation approaches. The "Option #6" and "Option #7" column entries are left blank, indicating that these accommodation approaches are not valid accommodation approaches for the latched version of Fault #1.

The entries in the table 420 can be populated using information obtained from a database or other data store, using the output of an artificial intelligence or the like, or using input obtained from an operator or manufacturer of the engine 110, or of the sensor or input device associated with the table 420. It should be noted that the same accommodation approach can be used for multiple potential faults. Some example faults include "signal loss" and "cross channel" faults, and the like. Some example accommodation approaches include "default value", "local average", "local channel", "remote channel", "alternate value", "last good value", "high value", "low value", and the like.

In some embodiments, the potential faults listed in the rows 422 are ranked or otherwise disposed in a hierarchy based on a severity level of the potential faults. For instance, the most severe potential fault is listed in the top-most of the rows 422. The severity levels can be obtained from a database or other data store, using the output of an artificial intelligence or the like, or using input obtained from an operator or manufacturer of the engine 110, or of the sensor or input device associated with the table 420. Similarly, the accommodation approaches listed in the columns 424 can be presented in a ranking indicative of which of the accommodation approaches to prioritize. In some embodiments, an accommodation approach using a sensor or input type which has been detected as faulty or latched can be prioritized over a sensor or input type which was previously detected as faulty or latched but since self-healed.

In some cases, the table 420 includes one or more rows 422 which are included by default in any embodiment of the table 420. For instance, the table 420 is designed to always include a "no-fault" row, since the fault accommodation tool should always include the case where the sensor or input type is functioning correctly. Alternatively, or in addition, the table 420 includes one or more columns 424 which are included by default in any embodiment of the table 420. For instance, the table 420 is designed to always include a "last good" column and/or a "default value" column, since the fault accommodation tool should always include at least one accommodation approach which can be used by default where none other is available to choose (the "last good" and "default value" columns can be, for example, Options #7 and #8). Other rows and/or columns which are included by default are considered.

In FIG. 4C, a table 430 for a fault accommodation tool is illustrated. The table 420 can also be associated with a particular type of sensor or input type; for example, the table 430 can be used with digital signals. Rows 432 and columns 434 are similar to the rows 422 and columns 424 of table 420.

With additional reference to FIG. 3, once the tables 410, 420, and/or 430 are filled, they can be used as the basis for generating different units of the fault management tool 310 of FIG. 3. For example, an embodiment of the table 410 associated with a single-channel temperature sensor can be used to generate the fault detection module 331, and an embodiment of the table 420 associated with a single-channel temperature sensor can be used to generate the fault accommodation module 332. The tables 410, 420 can be provided to a software suite which can automatically generate the fault detection and accommodation modules 331, 332 based thereon. In embodiments in which sensors 140 are used in a dual-channel configuration, the same embodiments of the tables 410, 420, can be used to generate the fault detection and accommodation modules 331, 332 for both channels.

When changes to the fault management tool 310 are required, for instance due to regulatory changes or engineering improvements, the tables 410, 420 can be updated to include additional rows and/or columns, or to vary the entries in the tables 410, 420, and the fault detection module and/or the fault accommodation module 331, 332 can be regenerated. In addition, because the fault management tool 310 may be developed independently from the controller 300, the engine 110, and/or the airframe 150, it may be applied to a plurality of versions of the controller 300, to a plurality of versions of the engine 110 and/or the airframe 150, and/or to a plurality of different types of engines 110 and/or airframes 150.

Figure 5:
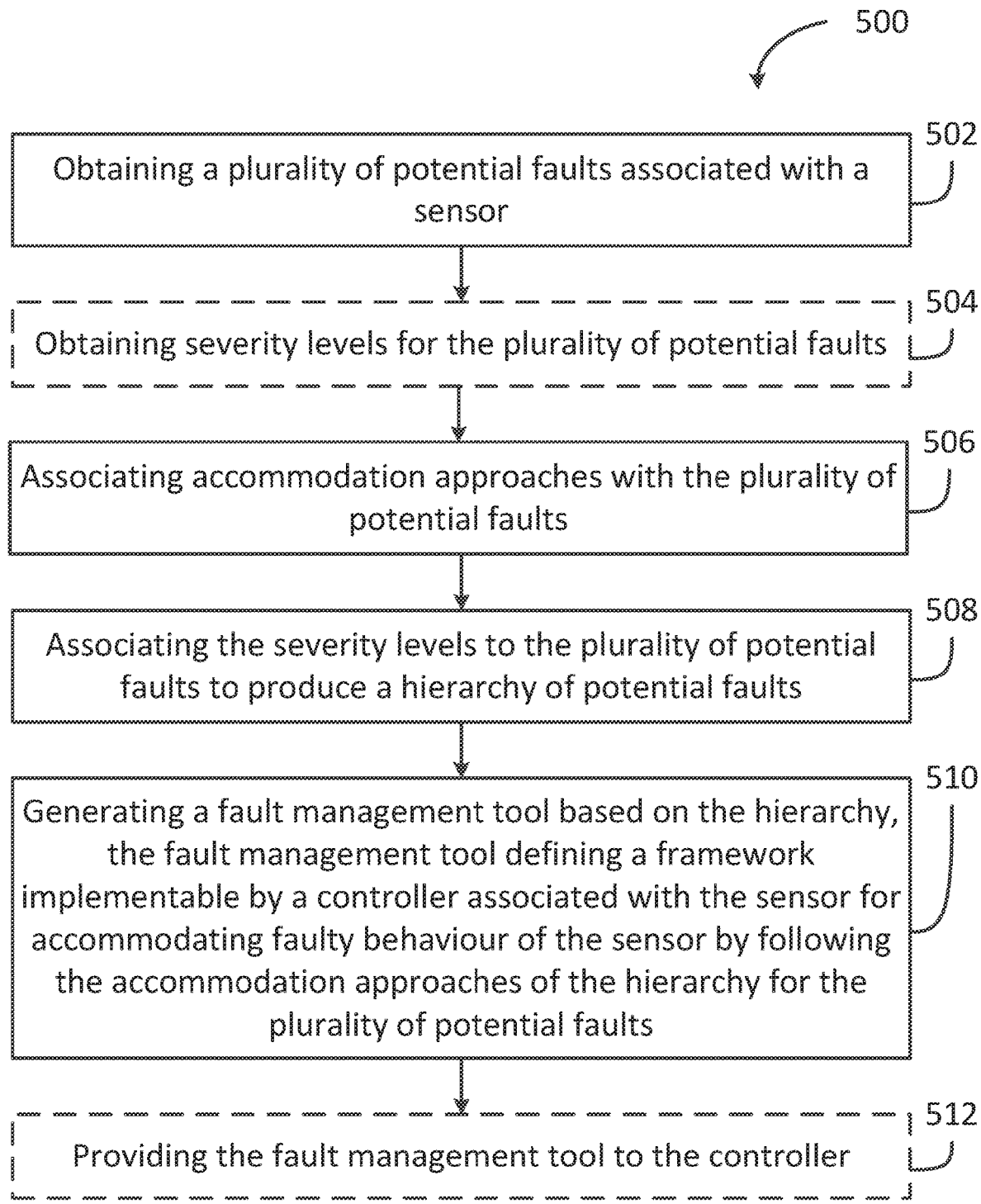
FIG. 5 is a flowchart illustrating an example method for generating a fault management tool for a sensor.

With reference to FIG. 5, there is illustrated a method 500 for generating a fault management tool for a sensor, for instance for one of the sensors 140, or for any other suitable input type, associated with the engine 110 or the airframe 150. At step 502, a plurality of potential faults, associated with the sensor 140, is obtained. The list of potential faults can be obtained from a database, as an output of an artificial intelligence, or based on inputs from a user.

Optionally, at step 504, severity levels for the plurality of potential faults are obtained. The severity levels indicate which of the plurality of potential faults are more severe than others, and can be based on the likelihood of adverse outcomes for the engine 110 or the airframe 150. In some embodiments, the severity levels are obtained substantially concurrently with the plurality of potential faults at step 502.

At step 506, accommodation approaches are associated with the plurality of potential faults. The accommodation approaches can be any suitable approaches, and can be obtained from a database, as an output of an artificial intelligence, or based on inputs from a user.

At step 508, the severity levels are associated to the plurality of potential faults to produce a hierarchy of potential faults. The hierarchy of potential faults can be used to indicate an order in which faults should be accommodated when more than one fault occurs concurrently.

At step 510, a fault management tool is generated based on the hierarchy, for instance the fault management tool 310. The fault management tool 310 defines a framework implementable by a controller, for instance the controller 300, for accommodating faulty behaviour of the sensor 140 by following the accommodation approaches of the hierarchy for the plurality of potential faults. The fault management tool 310 can then be used in conjunction with the controller 300 to perform fault management for the controller 300.

Optionally, at step 512, the fault management tool 310 is provided to the controller 300, for example by downloading the fault management tool 310 into the controller 300. The fault management tool 310 can be downloaded into the controller 300 over any suitable wired or wireless communication paths, as appropriate.

In some embodiments, the fault management tool 310 is embodied as a software module or other software tool, and be composed of computer-readable instructions which, when read by a processor or other processing unit, cause a computer to implement the fault detection and accommodation approaches detailed therein. In some other embodiments, the fault management tool 310 is embodied on a computer-readable medium storing the aforementioned computer-readable instructions. For example, the fault management tool 310 can be a memory card or other storage device which can be communicatively coupled to a larger computing system. In some further embodiments, the fault management tool 310 is composed of one or more physical computing devices, including ASICs, FPGAs, embedded computers, and the like, and can be communicatively coupled between the engine 110, the airframe 150, and/or the controller 300. Other embodiments are also considered.

Figure 6:
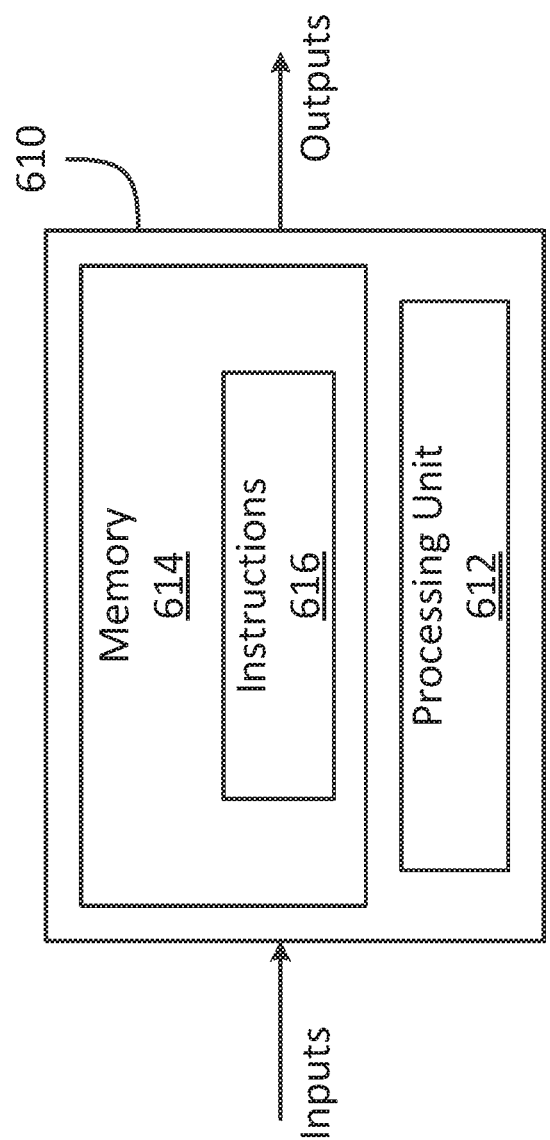
FIG. 6 is a block diagram of an example computing system for implementing the method of FIG. 5.

With reference to FIG. 6, the method 500 may be implemented using a computing device 610 comprising a processing unit 612 and a memory 614 which has stored therein computer-executable instructions 616. The processing unit 612 may comprise any suitable devices configured to implement the system such that instructions 616, when executed by the computing device 610 or other programmable apparatus, may cause the functions/acts/steps of the method 500 as described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612. In some embodiments, the computing device 610 can be implemented as part of a full-authority digital engine controls (FADEC) or other similar device, including electronic engine control (EEC), engine control unit (ECU), and the like.

Figure 7:
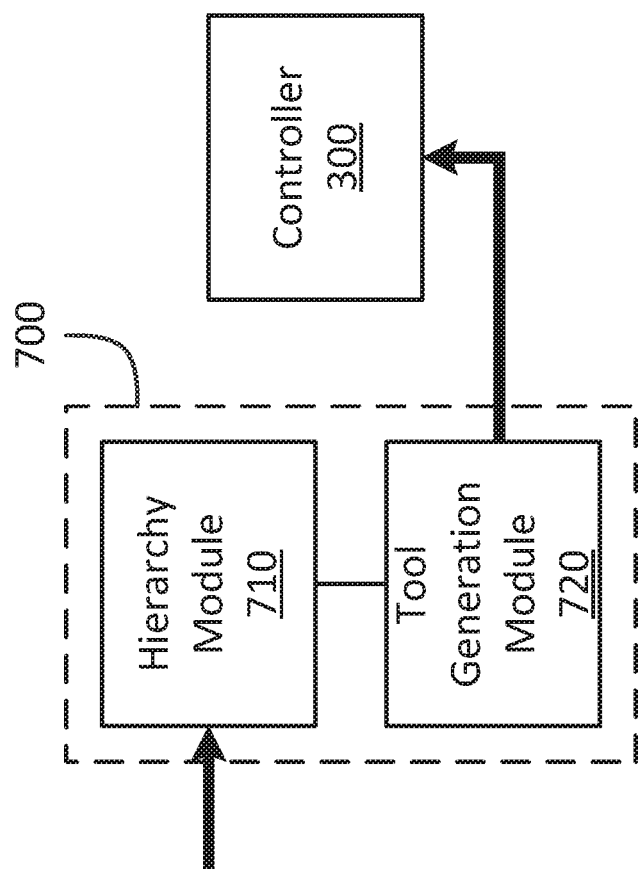
FIG. 7 is a block diagram of an example system for generating a fault management tool for a sensor.

With reference to FIG. 7, there is illustrated a system 700 for generating a fault management tool, for instance the fault management tool 310. The system 700 is composed of a hierarchy module 710, and a tool generation module 720.

The hierarchy module 710 is configured for obtaining a plurality of potential faults associated with a sensor or other input type, for instance the sensor 140, in accordance with step 502 of the method 500. The hierarchy module 710 is optionally configured for obtaining severity parameters associated with the plurality of potential faults, in accordance with step 504. The plurality of potential faults and the severity parameters can be obtained via any suitable source, as described hereinabove.

The hierarchy module 710 is also configured for associating accommodation approaches with the plurality of potential faults, in accordance with step 506, and for associating severity levels to the plurality of potential faults to produce a hierarchy of potential faults, in accordance with step 508. Once the hierarchy of potential faults is produced, the hierarchy module 710 can provide the hierarchy to the tool generation module 720.

The tool generation module 720 is configured for generating the fault management tool 310 based on the hierarchy for a controller associated with the sensor 140, for instance the controller 300. The fault management tool 310 defines a framework implementable by the controller 300 for accommodating faulty behaviour of the sensor 140 by following the accommodation approaches of the hierarchy for the plurality of potential faults. The tool generation module 720 can then provide the fault management tool 310 to the controller 300. For example, the fault management tool 310 can be downloaded into the controller 300.

The methods and systems described herein may be implemented in a high level procedural or object oriented programming or scripting language, or a combination thereof, to communicate with or assist in the operation of a computer system, for example the computing device 610. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 612 of the computing device 610, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for sensor fault management, comprising:
   obtaining a plurality of potential faults associated with a sensor;
   associating accommodation approaches with the plurality of potential faults, wherein associating the at least one accommodation approach with the plurality of potential faults comprises associating at least one of a last-good-value accommodation approach and a default-value accommodation approach with at least one of the plurality of potential faults;
   associating severity levels to the plurality of potential faults to produce a hierarchy of potential faults; and
   generating a fault management tool based on the hierarchy, the fault management tool defining a framework implementable by a controller associated with the sensor for accommodating faulty behaviour of the sensor by following the accommodation approaches of the hierarchy for the plurality of potential faults.

2. The method of claim 1, further comprising storing the fault management tool into a non-transitory memory of the controller.

3. The method of claim 1, wherein the fault management tool is applicable to a plurality of versions of an engine associated with the controller.

4. The method of claim 1, wherein the fault management tool is applicable to at least two engine types.

5. The method of claim 1, wherein obtaining the plurality of potential faults comprises obtaining, for at least some of the potential faults, more than one sensor state associated with different fault detection parameters.

6. The method of claim 1, wherein associating the severity levels to each of the plurality of potential faults comprises associating a null severity level with a no-fault state for the sensor.

7. The method of claim 1, further comprising obtaining at least one additional potential fault, associating an additional severity level to each of the at least one additional potential fault, and updating the hierarchy with the at least one additional potential fault.

8. The method of claim 1, further comprising obtaining an indication of at least one additional accommodation approach and updating the hierarchy to associate the at least one additional accommodation approach with at least one of the plurality of potential faults.

9. The method of claim 1, wherein associating the at least one accommodation approach with the plurality of potential faults comprises associating, with more than one of the potential faults, at least one common accommodation approach of the at least one accommodation approach.

10. A system for sensor fault management, comprising:
    a processing unit; and
    a non-transitory computer-readable memory communicatively coupled to the processing unit and comprising computer-readable program instructions executable by the processing unit for:
    obtaining a plurality of potential faults associated with a sensor;
    associating accommodation approaches with the plurality of potential faults, wherein associating the at least one accommodation approach with the plurality of potential faults comprises associating at least one of a last-good-value accommodation approach and a default-value accommodation approach with at least one of the plurality of potential faults;
    associating severity levels to the plurality of potential faults to produce a hierarchy of potential faults; and
    generating a fault management tool based on the hierarchy, the fault management tool defining a framework implementable by a controller associated with the sensor for accommodating faulty behaviour of the sensor by following the accommodation approaches of the hierarchy for the plurality of potential faults.

11. The system of claim 10, wherein the program instructions are further executable for storing the fault management tool into a non-transitory memory of the controller.

12. The system of claim 10, wherein the fault management tool is applicable to a plurality of versions of an engine associated with the controller.

13. The system of claim 10, wherein the fault management tool is applicable to at least two engine types.

14. The system of claim 10, wherein obtaining the plurality of potential faults comprises obtaining, for at least some of the potential faults, more than one sensor state associated with different fault detection parameters.

15. The system of claim 10, wherein associating the severity levels to each of the plurality of potential faults comprises associating a null severity level with a no-fault state for the sensor.

16. The system of claim 10, wherein the program instructions are further executable for obtaining at least one additional potential fault, associating an additional severity level to each of the at least one additional potential fault, and updating the hierarchy with the at least one additional potential fault.

17. The system of claim 10, wherein the program instructions are further executable for obtaining an indication of at least one additional accommodation approach and updating the hierarchy to associate the at least one additional accommodation approach with at least one of the plurality of potential faults.

18. The system of claim 10, wherein associating the at least one accommodation approach with the plurality of potential faults comprises associating, with more than one of the potential faults, at least one common accommodation approach of the at least one accommodation approach.

* * * * *